(12) United States Patent
Yonezawa et al.

(10) Patent No.: US 8,231,807 B2
(45) Date of Patent: Jul. 31, 2012

(54) LIQUID-CRYSTALLINE POLYESTER BLEND COMPOSITIONS

(75) Inventors: Satoru Yonezawa, Osaka (JP); Motoki Asahara, Osaka (JP)

(73) Assignee: Ueno Fine Chemicals Industry, Ltd., Osaka (JP)

( * ) Notice: Subject to any disclaimer, the term of this patent is extended or adjusted under 35 U.S.C. 154(b) by 144 days.

(21) Appl. No.: 12/815,600

(22) Filed: Jun. 15, 2010

(65) Prior Publication Data

US 2010/0314581 A1   Dec. 16, 2010

(30) Foreign Application Priority Data

Jun. 15, 2009   (JP) ................. 2009-142125

(51) Int. Cl.
| | |
|---|---|
| *C09K 19/38* | (2006.01) |
| *C09K 19/20* | (2006.01) |
| *C09K 19/32* | (2006.01) |
| *C09K 19/54* | (2006.01) |
| *C08G 63/06* | (2006.01) |
| *C08G 63/12* | (2006.01) |
| *B32B 27/36* | (2006.01) |

(52) U.S. Cl. ........... 252/299.67; 252/299.5; 252/299.62; 525/437; 525/444; 428/480

(58) Field of Classification Search ............. 252/299.01, 252/299.5, 299.62, 299.67; 525/437, 444; 428/480

See application file for complete search history.

(56) References Cited

U.S. PATENT DOCUMENTS

| | | | |
|---|---|---|---|
| 4,256,624 A | 3/1981 | Calundann | |
| 4,318,841 A | 3/1982 | East et al. | |
| 5,427,712 A | 6/1995 | Nakamura et al. | |
| 6,815,526 B2 | 11/2004 | Yokota et al. | |
| 7,063,892 B2 | 6/2006 | Okamoto et al. | |
| 2002/0049270 A1* | 4/2002 | Okamoto et al. | 524/341 |
| 2009/0111926 A1 | 4/2009 | Yonezawa et al. | |
| 2010/0203326 A1* | 8/2010 | Ok | 428/337 |

FOREIGN PATENT DOCUMENTS

| | | |
|---|---|---|
| JP | 9-232855 A | 9/1997 |
| JP | 2002-179776 A | 6/2002 |
| JP | 2004-196930 A | 7/2004 |
| JP | 2005-78806 A | 3/2005 |
| JP | 2007-154169 A | 6/2007 |
| JP | 2009-108191 A | 5/2009 |
| JP | 2009-138023 A | 6/2009 |
| JP | 2009-249536 A | 10/2009 |

* cited by examiner

*Primary Examiner* — Shean Wu
(74) *Attorney, Agent, or Firm* — Sughrue Mion, PLLC

(57) ABSTRACT

A liquid-crystalline polyester blend composition includes 100 parts by weight of a liquid-crystalline polyester blend and 0.1-300 parts by weight of calcium titanate and/or barium titanate, wherein the liquid-crystalline polyester blend can be obtained by combining liquid-crystalline polyester (A) (LCP A) and liquid-crystalline polyester (B) (LCP B) such that the ratio by weight of (LCP A)/(LCP B) is 99/1 to 80/20, wherein LCP A and LCP B are as defined in the specification, provided that at least one of LCP A and LCP B includes one or two repeating units that come from corresponding minor copolymerizing components selected from aromatic diol, aromatic dicarboxylic acid, aromatic monocarboxylic acid and aromatic monohydroxy compound.

10 Claims, No Drawings

LIQUID-CRYSTALLINE POLYESTER BLEND COMPOSITIONS

TECHNICAL FIELD

The present invention relates to a liquid-crystalline polyester blend composition which exhibits excellent dielectric properties in high-frequency regions as well as good impact strength and molding processability.

BACKGROUND OF THE INVENTION

In modern societies, multimedia in daily life is rapidly developing and ITS (Intelligent Transport Systems) such as the ETC device used in toll roads and the GPS is becoming widely used. In order to treat the extraordinary increase of information and telecommunications technologies, the frequency of signals used for transmission is increasing.

As material used for the information communication devices employing such a high frequency, engineering plastics which exhibit excellent dielectric properties in high frequency regions (especially in gigahertz bands) are attracting attention. The engineering plastics also exhibit good productivities and lightweight properties and, therefore, they are expected to be applied in the manufacture of chassis and packages of communication devices and electronic devices as well as in that of dielectric bodies and the like.

Among the engineering plastics, thermotropic liquid-crystalline polyester resin (hereinafter called liquid-crystalline polyester resin or LCP) has the following excellent properties and is especially expected to be suitable for manufacturing devices which use high-frequency signals:
(1) excellent dielectric properties: the relative permittivity ($\in r$) is constant in the frequency regions employed and dielectric loss tangent (tan $\delta$) is small,
(2) good physicality: mechanical properties including low-expansion property (dimensional stability), heat-resistance, flame-retardancy and rigidity are good, and
(3) good molding flowability: which allows processing of molded articles having down-sizing and thinner parts.

Among the liquid-crystalline polyester resins, liquid-crystalline polyesters comprising a large amount of a repeating unit derived from 6-hydroxy-2-naphthoic acid which is one of aromatic hydroxy carboxylic acid have been recently proposed in terms of their good heat-resistance and dielectric properties.

Though the liquid-crystalline polyesters comprising a large amount of a repeating unit derived from 6-hydroxy-2-naphthoic acid as aromatic hydroxycarboxylic acid (Japanese Patent Application laid open No. 2004-196930 corresponding to U.S. Pat. No. 7,063,892 and Japanese Patent Application laid open No. 2007-154169) exhibit excellent dielectric properties, their impact strength is relatively poor and, therefore, they are unsuitable for use in parts of a mobile phone or the like which tend to be impacted through being dropped in daily use.

With regard to a liquid-crystalline polyester resin disclosed in Japanese Patent Application laid open No. 2002-179776 (U.S. Pat. No. 6,815,526) which is obtained from a large amount of 6-hydroxy-2-naphthoic acid and a small amount of p-hydroxybenzoic acid as aromatic hydroxycarboxylic acids, it has a problem in relation to molding processability because it exhibits a high melting temperature.

In order to provide a liquid-crystalline polyester resin which exhibits good impact strength and molding processability, the present inventors conducted studies on liquid-crystalline polyesters which comprise a large amount of 6-hydroxy-2-naphthoic acid, and found that a liquid-crystalline polyester blend obtainable by combining a liquid-crystalline polyester which comprises a large amount of 6-hydroxy-2-naphthoic acid and a liquid-crystalline polyester which is obtainable by using a certain amount of p-hydroxybenzoic acid and 6-hydroxy-2-naphthoic acid as monomers exhibits good impact strength and molding processability (Japanese Patent Application laid open No. 2009-108191 corresponding to US Patent Application Publication No. 2009-111926).

However, though the liquid-crystalline polyester blend exhibit good mechanical and thermal properties when fillers such as glass fiber are admixed, their mechanical and thermal properties tend to be impaired when fillers with good dielectric properties such as calcium titanate and the like are admixed.

SUMMARY OF THE INVENTION

One object of the present invention is to provide a liquid-crystalline polyester blend composition which comprises fillers such as calcium titanate in order to improve the dielectric constant which exhibits extremely low dielectric loss tangent in high-frequency regions but exhibits good mechanical and thermal properties and molding processability.

The present inventors intensively studied liquid-crystalline polyesters comprising a large amount of 6-hydroxy-2-naphthoic acid and found that, when combining a liquid-crystalline polyester comprising a large amount of 6-hydroxy-2-naphthoic acid and a liquid-crystalline polyester obtainable by using p-hydroxybenzoic acid and 6-hydroxy-2-naphthoic acid, if a minor copolymerizing component which is selected from aromatic diol, aromatic dicarboxylic acid, aromatic monocarboxylic acid and aromatic monohydroxy compound is copolymerized in a production of at least one of the above two liquid-crystalline polyesters, the resulting liquid-crystalline polyester blend composition exhibits high dielectric properties without impairing mechanical and thermal properties even if fillers with good dielectric properties such as calcium titanate and barium titanate are admixed into the liquid-crystalline polyester blend composition.

Specifically, the present invention provides a liquid-crystalline polyester blend composition comprising 100 parts by weight of a liquid-crystalline polyester blend and 0.1-300 parts by weight of calcium titanate and/or barium titanate:
wherein said liquid-crystalline polyester blend is obtainable by combining liquid-crystalline polyester (A) (LCP A) and liquid-crystalline polyester (B) (LCP B) such that the ratio by weight of (LCP A)/(LCP B) is 99/1 to 80/20;
wherein,
LCP A consists of 100 molar parts of major repeating units and optionally 0.1-2 molar parts of one or two repeating units that come from corresponding minor copolymerizing components,
wherein the major repeating units are selected from the group consisting of aromatic oxycarbonyl repeating unit, aromatic dioxy repeating unit and aromatic dicarbonyl repeating unit, wherein 40-80 mol % of the major repeating units are the unit represented by formula (I); and the amounts of the aromatic dioxy repeating unit and the aromatic dicarbonyl repeating unit in the major repeating units are equimolar; and
LCP B is selected from the group consisting of liquid-crystalline polyester (b-1) (LCP b-1) and liquid-crystalline polyester (h-2) (LCP b-2), each consisting of 100 molar parts of major repeating units and optionally 0.1-2 molar parts of one or two repeating units that come from corresponding minor copolymerizing components;

wherein the major repeating units of LCP b-1 are aromatic oxycarbonyl repeating units; and the major repeating units of LCP b-2 are selected from the group consisting of aromatic oxycarbonyl repeating unit, aromatic dioxy repeating unit and aromatic dicarbonyl repeating unit, wherein the amounts of aromatic dioxy repeating unit and aromatic dicarbonyl repeating unit in the major repeating units are equimolar, wherein greater than or equal to 90 mol % of the major repeating units of LCP b-1 and LCP b-2 each are repeating units represented by formulae (I) and (II), and the molar proportion of the repeating units represented by formulae (I) to (II) is from 10/90 to 50/50;

provided that at least one of LCP A and LCP B comprises one or two repeating units that come from corresponding minor copolymerizing components selected from the group consisting of aromatic diol, aromatic dicarboxylic acid, aromatic monocarboxylic acid and aromatic monohydroxy compound

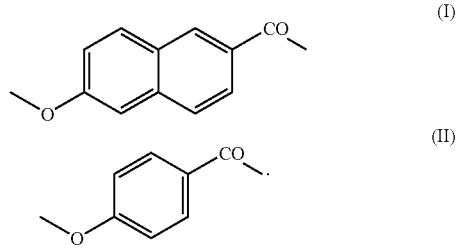

DETAILED DESCRIPTION OF THE PREFERRED EMBODIMENTS

The LCP A and LCP B contained in the liquid-crystalline polyester blend composition of the present invention are liquid-crystalline polyesters which exhibit anisotropic melt phase and are called thermotropic liquid-crystalline polyester by those skilled in the art.

The anisotropic melt phase can be confirmed by means of a conventional polarized light system using an orthogonal light polarizer. In more detail, the sample on the hot stage under a nitrogen atmosphere may be observed.

In the present specification and claims, the term "major repeating units" means all repeating units constituting the LCP A and LCP B excluding the repeating units derived from "minor copolymerizing component" as defined below.

In addition, the term "major monomer" means the monomer which provides the above "major repeating unit".

On the other hand, the term "minor copolymerizing component" is selected from aromatic diol, aromatic dicarboxylic acid, aromatic monocarboxylic acid or aromatic monohydroxy compound and is subjected to the copolymerization in at least one of the processes for preparing the LCP A and LCP B in the amount of 0.1-2 molar parts based on 100 molar parts of the major monomers constituting LCP A and/or LCP B.

LCP A is explained below.

LCP A used for the present invention comprises as major repeating units aromatic oxycarbonyl repeating units, aromatic dioxy repeating units and aromatic dicarbonyl repeating units, wherein, 40-80 mol %, preferably 45-70 mol %, and more preferably 50-65 mol % of the major repeating units are the repeating unit represented by formula (I).

The amount of the aromatic dioxy repeating units and the aromatic dicarbonyl repeating units in major repeating units of LCP A are equimolar.

LCP A used for the present invention may comprise two or more types of LCP A or may be a liquid-crystalline polyester blend which is obtainable by melt-mixing two or more types of LCP A as long as LCP A satisfies the above criteria.

The LCP A comprising the above described repeating units may include both of those which exhibit anisotropic melt phase and those which do not, depending on structural components of the polyester, and ratio and sequence distribution of the components. The LCP A used for the present invention is limited to those exhibiting anisotropic melt phase.

The aromatic oxycarbonyl repeating units as major repeating units are explained below.

The LCP A used for the present invention must contain the repeating unit represented by formula (I) as an aromatic oxycarbonyl repeating unit. Examples of major monomers which provide the repeating unit represented by formula (I) are 6-hydroxy-2-naphthoic acid as well as ester-forming derivatives such as acyl derivatives, ester derivatives and acid halide thereof.

Examples of major monomers which provide aromatic oxycarbonyl repeating units as major repeating units other than the repeating unit represented by formula (I) are aromatic hydroxycarboxylic acids such as 4-hydroxybenzoic acid, 3-hydroxybenzoic acid, 2-hydroxybenzoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid and alkyl-, alkoxy- or halogen-substituted derivatives as well as ester-forming derivatives such as acyl derivatives, ester derivatives and acid halide thereof.

The LCP A contains preferably 40-80 mol %, more preferably 45-70 mol % and even more preferably 50-65 mol % of aromatic oxycarbonyl repeating units as major repeating units based on the total major repeating units constituting the LCP A.

Preferably, the aromatic oxycarbonyl repeating unit contained in the LCP A as major repeating units is solely the repeating unit represented by formula (I).

Then, the aromatic dioxy repeating units as major repeating units are explained.

Examples of major monomers which provide aromatic dioxy repeating units are aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyl ether and alkyl-, alkoxy- or halogen-substituted derivatives as well as ester-forming derivatives such as acyl derivatives thereof.

Among the aromatic dioxy repeating units as major repeating units derived from the above major monomers, aromatic dioxy repeating units constituting the LCP A is preferably one or more repeating units selected from the group consisting of the repeating units represented by formulae (1) to (3) in terms of controlling melting point and the like of the resulting LCP A. In addition, LCP A preferably contains the repeating unit represented by formula (3) in an amount of equal to or greater than 50 mol %, more preferably 80-99.9 mol %, even more preferably 85-99 mol %, and most preferably 90-98 mol % based on the total amount of aromatic dioxy repeating units as major repeating units in terms of good heat-resistance and excellent mechanical properties of the resulting LCP A.

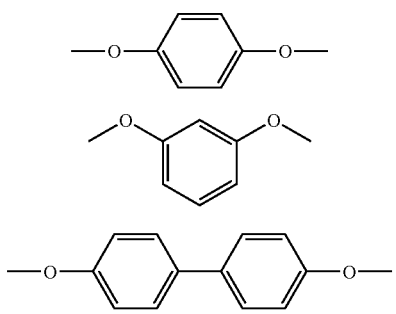

(1)
(2)
(3)

Then, the aromatic dicarbonyl repeating units as major repeating units are explained.

Examples of major monomers which provide aromatic dicarbonyl repeating units are aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl and alkyl-, alkoxy- or halogen-substituted derivatives as well as ester-forming derivatives such as ester derivatives and acid halide thereof.

Among the aromatic dicarbonyl repeating units as major repeating units derived from the above described major monomers, aromatic dicarbonyl repeating units constituting the LCP A preferably include one or more repeating units selected from the group consisting of the repeating units represented by formulae (4) to (6) in terms of controlling mechanical properties, heat-resistance, melting point and molding processability of the resulting LCP A.

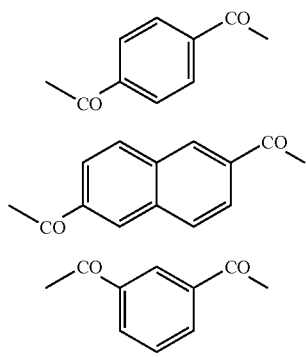

(4)
(5)
(6)

The LCP A must contain as major repeating units aromatic dioxy repeating units and aromatic dicarbonyl repeating units in an equimolar amount.

Examples of the preferable combinations of repeating units constituting the LCP A are listed below:

1) 6-hydroxy-2-naphthoic acid/4,4'-dihydroxybiphenyl/hydroquinone terephthalic acid copolymer
2) 6-hydroxy-2-naphthoic acid/4,4'-dihydroxybiphenyl/hydroquinone/2,6-naphthalenedicarboxylic acid copolymer
3) 6-hydroxy-2-naphthoic acid/4,4'-dihydroxybiphenyl/hydroquinone/isophthalic acid copolymer
4) 6-hydroxy-2-naphthoic acid/4,4'-dihydroxybiphenyl/resorcin/terephthalic acid copolymer
5) 6-hydroxy-2-naphthoic acid/4,4'-dihydroxybiphenyl/resorcin/2,6-naphthalenedicarboxylic acid copolymer
6) 6-hydroxy-2-naphthoic acid/4,4'-dihydroxybiphenyl/resorcin/isophthalic acid copolymer
7) 6-hydroxy-2-naphthoic acid/4-hydroxybenzoic acid/4,4'-dihydroxybiphenyl/terephthalic acid copolymer
8) 6-hydroxy-2-naphthoic acid/4-hydroxybenzoic acid/4,4'-dihydroxybiphenyl/2,6-naphthalenedicarboxylic acid copolymer
9) 6-hydroxy-2-naphthoic acid/4-hydroxybenzoic acid/4,4'-dihydroxybiphenyl/isophthalic acid copolymer
10) 6-hydroxy-2-naphthoic acid/4-hydroxybenzoic acid/4,4'-dihydroxybiphenyl/hydroquinone/terephthalic acid copolymer
11) 6-hydroxy-2-naphthoic acid/4-hydroxybenzoic acid/4,4'-dihydroxybiphenyl hydroquinone 2,6-naphthalenedicarboxylic acid copolymer
12) 6-hydroxy-2-naphthoic acid/4-hydroxybenzoic acid/4,4'-dihydroxybiphenyl/hydroquinone/isophthalic acid copolymer
13) 6-hydroxy-2-naphthoic acid/4,4'-dihydroxybiphenyl/hydroquinone terephthalic acid 2,6-naphthalenedicarboxylic acid copolymer
14) 6-hydroxy-2-naphthoic acid/4,4'-dihydroxybiphenyl/hydroquinone/terephthalic acid/isophthalic acid copolymer
15) 6-hydroxy-2-naphthoic acid/4,4'-dihydroxybiphenyl/hydroquinone/2,6-naphthalenedicarboxylic acid/isophthalic acid copolymer
16) 6-hydroxy-2-naphthoic acid/4,4'-dihydroxybiphenyl/resorcin/terephthalic acid/2,6-naphthalenedicarboxylic acid copolymer
17) 6-hydroxy-2-naphthoic acid/4,4'-dihydroxybiphenyl/resorcin/terephthalic acid/isophthalic acid copolymer
18) 6-hydroxy-2-naphthoic acid/4,4'-dihydroxybiphenyl/resorcin/2,6-naphthalenedicarboxylic acid/isophthalic acid copolymer
19) 6-hydroxy-2-naphthoic acid/4,4'-dihydroxybiphenyl/terephthalic acid copolymer
20) 6-hydroxy-2-naphthoic acid/4,4'-dihydroxybiphenyl/2,6-naphthalenedicarboxylic acid copolymer
21) 6-hydroxy-2-naphthoic acid/4,4'-dihydroxybiphenyl/isophthalic acid copolymer
22) 6-hydroxy-2-naphthoic acid/hydroquinone/terephthalic acid copolymer
23) 6-hydroxy-2-naphthoic acid/hydroquinone/2,6-naphthalenedicarboxylic acid copolymer
24) 6-hydroxy-2-naphthoic acid/hydroquinone/isophthalic acid copolymer.

Among the above, the copolymers of 1), 2), 4), 7), 8), 10), 11) and 23) are more preferable.

The LCP B is then explained below.

The LCP B used for the present invention is selected from the group consisting of liquid-crystalline polyester (b-1) (LCP b-1) and liquid-crystalline polyester (b-2) (LCP b-2), wherein greater than or equal to 90 mol % of the major repeating units of LCP b-1 and LCP b-2 each are repeating units represented by formulae (I) and (II), and the molar proportion of the repeating units represented by formulae (I) to (II) (formula (I)/formula (II)) is from 10/90 to 50/50:

wherein the major repeating unit of LCP b-1 is aromatic oxycarbonyl repeating unit; and the major repeating units of LCP b-2 are selected from the group consisting of aromatic oxycarbonyl repeating unit, aromatic dioxy repeating unit and aromatic dicarbonyl repeating unit, wherein the amounts of aromatic dioxy repeating unit and aromatic dicarbonyl repeating unit in the major repeating units are equimolar.

The type and the composition of the repeating units constituting the LCP B are not specifically limited as long as the LCP B contains the repeating units represented by formulae (I) and (II) as major repeating units in the amount and proportion defined above.

When the LCP B contains, as major repeating unit, aromatic dioxy repeating unit and aromatic dicarbonyl repeating unit (i.e. LCP B is LCP b-2), the amounts of aromatic dioxy repeating unit and aromatic dicarbonyl repeating unit as major repeating units are equimolar.

LCP B used for the present invention may comprise two or more types of LCP B or may be a liquid-crystalline polyester blend which is obtainable by melt-mixing two or more types of LCP B as long as LCP B satisfies the above criteria.

In the LCP B, the total amount of the repeating units represented by formulae (I) and (II) as major repeating units is 90-100 mol %, preferably 95-100 mol % and more preferably 100 mol % based on the total amount of the major repeating units constituting the LCP B. When the total amount of the repeating units represented by formulae (I) and (II) as major repeating units is below 90 mol %, mechanical strength, especially Izod impact strength of the resulting liquid-crystalline polyester blend composition, tends to decrease.

In the LCP B, the relative molar proportion of the repeating unit represented by formula (I) to the repeating unit represented by formula (II) as major repeating units is from 10/90 to 50/50, preferably from 20/80 to 40/60 and more preferably from 25/75 to 30/70.

The LCP B comprising the above described repeating units may include both of those which exhibit anisotropic melt phase and those which do not depending on structural components of the polyester, and ratio and sequence distribution of the components. The LCP B used for the present invention is limited to those exhibiting anisotropic melt phase.

The LCP B used for the present invention essentially contains the repeating units represented by formulae (I) and (II) as aromatic oxycarbonyl repeating units which are major repeating units. Examples of major monomers which provide the repeating unit represented by formula (I) are 6-hydroxy-2-naphthoic acid as well as ester-forming derivatives such as acyl derivatives, ester derivatives and acid halide thereof. Examples of major monomers which provide the repeating units represented by formula (II) are 4-hydroxybenzoic acid as well as ester-forming derivatives such as acyl derivatives, ester derivatives and acid halide thereof.

Examples of major monomers which provide aromatic oxycarbonyl repeating units other than those represented by formulae (I) and (II) constituting the LCP B are aromatic hydroxycarboxylic acids such as 3-hydroxybenzoic acid, 2-hydroxybenzoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid and alkyl-, alkoxy- or halogen-substituted derivatives as well as ester-forming derivatives such as acyl derivatives, ester derivatives and acid halide thereof.

Examples of major monomers which provide aromatic dioxy repeating units and aromatic dicarbonyl repeating units as major repeating units constituting the LCP B are the same as those listed with regard to the LCP A.

At least one of the LCP A and the LCP B comprises one or two repeating units that come from corresponding minor copolymerizing components selected from the group consisting of aromatic diol, aromatic dicarboxylic acid, aromatic monocarboxylic acid and aromatic monohydroxy compound. The amount of the minor copolymerizing components based on the 100 molar parts of the total amounts of major monomers constituting LCP A and/or LCP is 0.1-2 molar parts, preferably 0.2-1 molar parts. When two types of minor copolymerizing components are used, the combination of the minor copolymerizing components is preferably selected from aromatic diol and aromatic monohydroxy compound, or, aromatic dicarboxylic acid and aromatic monocarboxylic acid.

When the molar parts of the minor copolymerizing component based on the total amount of major monomers constituting LCP A and/or LCP B is below 0.1, the reaction suppressing effect upon blending LCP A and LCP B is insufficient and when molar parts of the minor copolymerizing component based on the total amount of major monomers constituting LCP A and/or LCP B is above 2, the molecular weight of LCP A and/or LCP B is not sufficiently increased and, therefore, a polymer with sufficient length cannot be obtained.

Examples of aromatic diol used as the minor copolymerizing component constituting LCP A and/or LCP B in addition to the major monomers include aromatic diols such as hydroquinone, resorcin, 2,6-dihydroxynaphthalene, 2,7-dihydroxynaphthalene, 1,6-dihydroxynaphthalene, dihydroxynaphthalene, 4,4'-dihydroxybiphenyl, 3,3'-dihydroxybiphenyl, 3,4'-dihydroxybiphenyl, 4,4'-dihydroxybiphenylether and alkyl-, alkoxy- or halogen-substituted derivatives as well as ester-forming derivatives such as acyl derivatives thereof.

Examples of aromatic dicarboxylic acid used as the minor copolymerizing component constituting LCP A and/or LCP B in addition to the major monomers include aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl and alkyl-, alkoxy- or halogen-substituted derivatives as well as ester-forming derivatives thereof.

Examples of aromatic monocarboxylic acid used as the minor copolymerizing component constituting LCP A and/or LCP B in addition to the major monomers include benzoic acid, phenyl benzoic acid, 2-naphthoic acid and alkyl-, alkoxy- or halogen-substituted derivatives as well as ester-forming derivatives thereof.

Examples of aromatic monohydroxy compound used as the minor copolymerizing component constituting LCP A and/or LCP B in addition to the major monomers include β-naphthol, ortho-phenyl phenol and alkyl-, alkoxy- or halogen-substituted derivatives as well as ester-forming derivatives such as acyl derivatives thereof.

Among the above minor copolymerizing components, terephthalic acid, 2,6-naphthalenedicarboxylic acid or 4,4'-dihydroxybiphenyl are preferably copolymerized with the major monomers constituting the LCP A and/or LCP B.

In the present invention, when preparing LCP A and/or LCP B, a certain amount of the minor copolymerizing component which is selected from the group consisting of aromatic diol, aromatic dicarboxylic acid, aromatic monocarboxylic acid and aromatic monohydroxy compound is subjected to the polymerizing reaction. The resulting LCP A and/or LCP H is used for preparing a liquid-crystalline polyester blend. To thus obtained liquid-crystalline polyester blend, fillers such as calcium titanate and barium titanate are admixed to give the liquid-crystalline polyester blend composition of the present invention. The liquid-crystalline polyester blend composition of the present invention exhibits good physicality though it contains the fillers which might impair the physicality of the composition.

In general, two types of liquid-crystalline polyester are blended, the resulting liquid-crystalline polyester blend tends to exhibit decreased heat-resistance because two polyesters are reacted in the blending process. In particular, when fillers having reaction-promoting effects such as calcium titanate and barium titanate are added, the reaction in the blending process may be further promoted and then the resulting blend composition tends to exhibit significantly decreased heat-resistance. However, in the present invention, at least one of LCP A and LCP B is prepared by a method which comprises copolymerizing a certain amount of a minor copolymerizing component which is selected from the group consisting of aromatic diol, aromatic dicarboxylic acid, aromatic monocarboxylic acid and aromatic monohydroxy compound. The promotion of the reaction of the resulting LCP A and LCP R upon blending the LCP A and the LCP B is suppressed and, therefore, the resulting liquid-crystalline polyester blend composition retains high heat-resistance though it contains fillers such as calcium titanate and barium titanate.

Methods for preparing LCP A and LCP B are explained below.

The method for preparing the LCP A and the LCP B used for the present invention is not limited and any method known to the art can be employed. For example, conventional polymerization methods such as molten acidolysis and slurry polymerization methods for preparing polymer to give ester bonding among the above described major monomers and minor copolymerizing components may be employed.

The molten acidolysis method is preferably used for preparing the LCP A and the LCP B used for the present invention. In this method, the monomers are heated to yield a molten solution and then the solution is reacted to yield the molten polymer. The final step of this method may be carried out in vacuo to facilitate removal of the volatile by-products such as acetic acid or water.

The slurry polymerization method is characterized in that monomers are reacted in a heat-exchange fluid to give solid-state polymer in the form of suspension in the heat-exchange liquid medium.

In either the molten acidolysis method or the slurry polymerization method, the polymerizing monomer may be in the form of a lower acyl derivative obtained by acylating the hydroxyl and/or amino group at room temperature. The lower acyl group may have preferably 2-5, and more preferably 2-3, carbon atoms. Acetylated monomers are most preferably used for the reaction.

The lower acyl derivatives of the monomers may be those prepared beforehand by acylating the monomers independently or may be those produced in the reaction system by adding an acylating agent such as acetic anhydride to the monomers upon preparing the LCP A and the LCP B.

In either the molten acidolysis method or the slurry polymerization method, a catalyst may be used in the reaction, if desired.

Examples of catalysts include organic tin compounds such as dialkyl tin oxide (ex. dibutyl tin oxide) and diaryl tin oxide; titanium compounds such as titanium dioxide, antimony trioxide, alkoxy titanium silicate and titanium alkoxide; alkaline or alkaline earth metal salt of carboxylic acid such as potassium acetate; salts of inorganic acid (ex. $K_2SO_4$); Lewis acid (ex. $SF_3$); and gaseous acid catalysts such as and halogenated hydrogen (ex. HCl).

When a catalyst is used, the amount of the catalyst added to the reaction based on the total monomers may preferably be 10-1000 ppm, and more preferably 20-200 ppm.

The LCP A and the LCP B used for the present invention may be obtained from the polymerizing reaction vessel in molten state and processed to give pellets, flakes or powders. Thereafter, the LCP A and the LCP B in the form of pellets, flakes or powders may be subjected to the solid phase heating process in vacuo or under inert gas atmospheres such as nitrogen gas and helium gas in order to improve heat-resistance and the like, if desired.

The liquid-crystalline polyester blend composition of the present invention is obtained by combining the LCP A, the LCP B and calcium titanate and/or barium titanate. The liquid-crystalline polyester blend composition of the present invention may be obtained by melt-kneading the mixture of the LCP A, the LCP B and calcium titanate and/or barium titanate using a kneading machine such as Banbury mixer, kneader, single-screw extruder, twin-screw extruder or the like.

The ratio by weight of the LCP A to the LCP B is from 99/1 to 80/20, preferably from 95/5 to 80/20 and more preferably from 90/10 to 80/20.

When the ratio by weight of the LCP A to the LCP B is more than 99/1, the resulting liquid-crystalline polyester blend composition tends to exhibit less improved flowability and processability at low temperatures and when the ratio by weight of the LCP A to the LCP is less than 80/20, the resulting liquid-crystalline polyester blend composition tends to exhibit insufficient impact strength.

The liquid-crystalline polyester blend composition of the present invention exhibits excellent dielectric properties without impairing mechanical properties and thermal properties thought it contains calcium titanate and/or barium titanate.

In the present invention, "excellent dielectric property" means high dielectric constant and low dielectric loss tangent.

The liquid-crystalline polyester blend composition of the present invention comprises 100 parts by weight of the total amount of the LCP A and the LCP B and 0.1-300 parts by weight, preferably 1-250 parts by weight, more preferably 10-200 parts by weight of calcium titanate and/or barium titanate.

If the amount of calcium titanate and/or barium titanate is above 300 parts by weight based on 100 parts by weight of the total amount of LCP A and LCP B, the moldability of the liquid-crystalline polyester blend composition tends to be decreased or the exhausting of the cylinder or die of the molding device tends to be increased.

The liquid-crystalline polyester blend composition may comprise further fillers in addition to calcium titanate and/or barium titanate.

Examples of further fillers which may be contained in the liquid-crystalline polyester blend composition of the present invention in addition to calcium titanate and/or barium titanate include at least one of glass fiber, silica-alumina fiber, alumina fiber, carbon fiber, potassium titanate fiber, aluminium borate fiber, aramid fiber, talc, mica, graphite, wollastonite, dolomite, clay, glass flake, glass beads, glass balloon, calcium carbonate, barium sulfate and titanium oxide. Among them, glass fiber is preferably used because of its good balance of physical properties and cost.

The liquid-crystalline polyester blend composition of the present invention comprises 100 parts by weight of the total amount of the LCP A and the LCP B and 0.1-400 parts by weight, preferably 1-300 parts by weight of the total amount of calcium titanate and/or barium titanate and further additional fillers.

If the total amount of calcium titanate and/or barium titanate and additional fillers is above 400 parts by weight based on 100 parts by weight of the total amount of LCP A and LCP B, the moldability of the liquid-crystalline polyester blend composition tends to be decreased or the exhausting of the cylinder or die of the molding device tends to be increased.

The liquid-crystalline polyester blend composition of the present invention exhibits high dielectric constants as well as low dielectric loss tangents in high-frequency regions such as gigahertz bands. Specifically, the dielectric constant measured at the frequency of 1 GHz using a stick-shaped test piece with length of 85 mm, width of 1.75 mm and thickness of 1.75 mm is greater than or equal to 5, and preferably greater than or equal to 7. The dielectric loss tangent (tan δ) measured at the frequency of 1 GHz using a stick-shaped test piece with length of 85 mm, width of 1.75 mm and thickness of 1.75 mm is preferably less than or equal to 0.003 and more preferably less than or equal to 0.0015.

The dielectric constant and the dielectric loss tangent of the liquid-crystalline polyester blend composition of the present invention can be measured by resonant cavity perturbation method.

Further, the Izod impact strength of the liquid-crystalline polyester blend composition of the present invention measured according to ASTM D256 using a bending test piece with length of 63.5 mm, width of 12.7 mm and thickness of 3.2 mm is preferably greater than or equal to 10 J/m, more preferably greater than or equal to 15 J/m and even more preferably greater than or equal to 20 J/m and, therefore, it exhibits an excellent Izod impact strength.

The liquid-crystalline polyester blend composition according to the present invention may further be admixed with one or more additives, if desired. For example, molding lubricant such as higher aliphatic acid, higher aliphatic ester, higher aliphatic amide, higher aliphatic acid metal salt, polysiloxane and fluorocarbon resin; colorant such as dyes and pigments; antioxidant; thermal stabilizer; UV absorbent; antistatic agent; and surface active agent may be admixed. The term "higher" group herein used refers to the group of 10-25 carbon atoms.

Molding lubricants such as higher aliphatic acid, higher aliphatic ester, higher aliphatic acid metal salt or fluorocarbon-type surfactant may be added to the pellets of the liquid-crystalline polyester blend composition before subjecting the pellets to the molding process, so that the agents adhere to the outer surface of the pellet.

The liquid-crystalline polyester blend composition of the present invention may comprise one or more additional resin components which can be subjected to processing such as molding at the same range of temperatures as the liquid-crystalline polyester blend composition of the present invention, unless the additional resin component impairs the object of the present invention. Examples of additional resin components include thermoplastic resins such as polyamide, polyester, polyacetal, polyphenylene ether and denatured derivatives thereof, polysulfone, polyethersulfone, polyether imide and polyamideimide, and thermosetting resins such as phenol resin, epoxy resin and polyimide resin. The amount of the additional resin components is not limited, and may be determined dependent on the intended property. Typically, such additional resins may be added to the liquid-crystalline polyester blend composition in an amount of 0.1-100 parts by weight, preferably 0.1-80 parts by weight per 100 parts by weight of the total weight amount of the LCP A and the LCP B.

The liquid-crystalline polyester blend composition of the present invention may be processed in a conventional manner to give molded articles, film, sheets, bonded textiles and the like. For example, injection molding or extrusion techniques may preferably be used.

The liquid-crystalline polyester blend composition of the present invention exhibits excellent dielectric properties in high-frequency regions as well as high impact strength and good molding processability and, therefore, is suitable for manufacturing electronic parts of antennae, connectors, substrates and the like which use high-frequency signals.

The present invention is further described in reference to the following Examples.

In the Examples and Comparative Examples, deflection temperature under load (DTUL), flexural strength, Izod impact strength, dielectric constant and dielectric loss tangent (tan δ) were assessed by the following procedures.

1) Deflection Temperature Under Load (DTUL)

A test piece with a length of 127 mm, width of 12.7 mm and thickness of 3.2 mm was molded from a liquid-crystalline polyester blend composition using an injection-molding machine (UH 1000-110, Nissei Plastic Industrial Co., Ltd). Deflection temperature was measured using the test piece according to ASTM D648 under a load of 1.82 MPa and with a heating rate of 2° C./min.

2) Flexural Strength

A bending test piece with a length of 127 mm, width of 12.7 mm and thickness of 3.2 mm was molded from a liquid-crystalline polyester blend composition using an injection-molding machine (UH 1000-110, Nissei Plastic Industrial Co., Ltd) with a clamping pressure of 110 tons, cylinder temperature of 350° C. and die temperature of 70° C. Flexural strength was measured according to ASTM D790.

3) Izod Impact Strength

The central part of the same test piece as that used for measuring deflection temperature under load was vertically cut in a lengthwise direction to give the test piece with a length of 63.5 mm, width of 12.7 mm, and thickness of 3.2 mm. Izod impact strength was measured according to ASTM D256 using the test piece.

4) Dielectric Constant and Dielectric Loss Tangent (tan δ)

A stick-shaped test piece with a length of 85 mm, width of 1.75 mm and thickness of 1.75 mm was molded from a liquid-crystalline polyester blend composition using an injection-molding machine (PS40, Nissei Plastic Industrial Co., Ltd.). The dielectric constant and the dielectric loss tangent at 1 GHz were measured using the test piece with a vector network analyzer (Agilent Technologies Japan, Ltd.) according to the resonant cavity perturbation method.

In the Synthesis Examples and Examples, the following abbreviations are used.

[Liquid-Crystalline Polyester Resin Monomer]

BON6: 6-hydroxy-2-naphthoic acid

POB: 4-hydroxybenzoic acid

BP: 4,4'-dihydroxybiphenyl

HQ: hydroquinone

TPA: terephthalic acid

Synthesis Example 1

The Synthesis of LCP-I

BON6, BP, HQ and TPA were fed into a reaction container equipped with an agitating device with torque-meter and a condenser in the ratio shown in table 1 so that the total monomer amount was 1840 mol. Then potassium acetate 7.55 g (22.6 ppm to the total amount of the monomers) and acetic anhydride 1.03 fold moles to the total amount (moles) of hydroxy groups of the monomers were added to the container. The mixture was polymerized under the following condition.

TABLE 1

Synthesis Example 1, monomer ratio

|  | BON6 | BP | HQ | TPA |
|---|---|---|---|---|
| kg | 187.2 | 73.8 | 3.1 | 70.3 |
| mol % | 54 | 21.5 | 1.5 | 23 |

Synthesis Example 2

Synthesis of LCP-II (LCP A)

In addition to the components of the above Synthesis Example 1, terephthalic acid 1.5 kg (0.5 molar parts based on 100 molar parts of the total monomers used in Synthesis Example 1) was added to the container. The mixture was polymerized under the same condition as that of Synthesis example 1, except that potassium acetate 7.59 g was used.

Synthesis Example 3

Synthesis of LCP-III

POB and BON6 were fed into a reaction container equipped with an agitating device with torque-meter and a condenser in the ratio shown in table 2 so that the total monomer amount was 1840 mol. Acetic anhydride 1.03 fold moles to the total amount (moles) of hydroxy groups of the monomers was added to the container. The mixture was polymerized under the following condition.

TABLE 2

Synthesis Example 3, monomer ratio

|  | POB | BON6 |
|---|---|---|
| kg | 185.7 | 93.6 |
| mol % | 73 | 27 |

Under the nitrogen atmosphere, the mixture was heated from room temperature to 150° C. over a period of 1 hour and kept at 150° C. for 30 minutes, then rapidly heated to 210° C. while the by-product acetic acid was distilled out. Then the mixture was kept at 210° C. for 30 minutes. Thereafter, the mixture was heated to 325° C. over a period of five hours. Then the pressure was reduced to 20 mmHg over a period of 90 minutes. When the torque reached the predetermined level, the polymerizing reaction was terminated. The resulting polymer was removed from the container in the form of strands and the strands were cut to give pellets of a liquid-crystalline polyester. As a result, the approximately calculated theoretical amount of acetic acid was distilled out.

Synthesis Example 4

Synthesis of LCP-IV (LCP B)

In addition to the components of the above Synthesis Example 3, terephthalic acid 1.5 kg (0.5 molar parts based on 100 molar parts of the total monomers used in Synthesis Example 1) was added to the container. The mixture was polymerized under the same condition as that of Synthesis example 3.

Example 1 to 9 and Comparative Examples 1 to 3

LCP-I to LCP-IV were mixed in the ratio by weight shown in Table 3 and calcium titanate and/or barium titanate and/or glass fiber was added to the mixture. The mixture was molt-kneaded using a twin-screw extruder TEX-30 (The Japan Steel Works, LTD.) at 350° C. to yield pellets of a liquid-crystalline polyester blend composition.

Regarding the resulting pellets, deflection temperature under load (DTUL), flexural strength, Izod impact strength, dielectric constant and dielectric loss tangent were measured.

The results are shown in Table 3.

TABLE 3

Physicalities of the liquid-crystalline polyester blend composition

|  |  | Examples | | | | | | | | | Comparative Examples | | |
|---|---|---|---|---|---|---|---|---|---|---|---|---|---|
|  |  | 1 | 2 | 3 | 4 | 5 | 6 | 7 | 8 | 9 | 1 | 2 | 3 |
| blend ratio (wt %) | LCP-I |  |  | 86 |  |  |  |  |  |  | 86 | 86 |  |
|  | LCP-II | 86 | 86 |  | 86 | 86 | 86 | 90 | 80 | 80 |  |  | 86 |
|  | LCP-III |  |  | 14 |  |  |  |  |  |  | 14 | 14 |  |
|  | LCP-IV | 14 | 14 |  | 14 | 14 | 14 | 10 | 20 | 20 |  |  | 14 |
| Calcium titanate |  | 67 | 67 | 67 | 67 | 100 |  | 150 | 30 | 67 | 67 | 67 |  |
| Barium titanate |  |  |  |  |  |  | 30 |  | 20 |  |  |  |  |
| Glass fiber |  |  |  |  | 9 |  |  | 9 |  |  |  | 9 | 67 |
| DTUL (° C.) |  | 240 | 229 | 225 | 264 | 224 | 253 | 221 | 235 | 223 | 213 | 248 | ≧290 |
| Flexural strength (MPa) |  | 147 | 145 | 149 | 133 | 134 | 171 | 137 | 164 | 135 | 146 | 127 | 230 |
| Flexural modulus (GPa) |  | 9 | 10 | 10 | 10 | 9 | 9 | 10 | 9 | 10 | 10 | 10 | 18 |
| Izod(J/m) |  | 24 | 23 | 27 | 20 | 20 | 72 | 21 | 25 | 23 | 22 | 18 | 45 |
| Dielectric constant |  | 7.2 | 7.2 | 7.2 | 7.5 | 8.8 | 5.2 | 11.7 | 6.5 | 7.3 | 7.2 | 7.4 | 4.5 |
| Dielectric loss tangent tanδ (×10$^{-3}$) |  | 1.2 | 1.2 | 1.2 | 1.5 | 1.3 | 1.5 | 1.4 | 1.5 | 1.5 | 1.2 | 1.7 | 3.2 |

※The amount of calcium titanate/barium titanate and glass fiber is expressed as parts by weight based on 100 parts by weight of the total amount of LCP-I to LCP IV.

The liquid-crystalline polyester blend composition of Examples 1 to 9 all exhibited excellent dielectric properties, i.e. dielectric constants equal to or greater than 5 and dielectric loss tangents equal to or smaller than 0.0015. Further, the liquid-crystalline polyester blend composition of Examples 1 to 9 all exhibited good heat resistance and impact strength, i.e. deflection temperature under load (DTUL) equal to or higher than 220° C., flexural strength equal to or greater than 130 MPa and Izod impact strength equal to or greater than 20 J/m.

On the other hand, though the liquid-crystalline polyester blend composition of Comparative Examples 1 and 2, which are the blend of LCP-I and LCP-III, exhibited high dielectric constants and low dielectric loss tangents by addition of calcium titanate, at least one of the deflection temperature under load (DTUL), flexural strength and Izod impact strength of these compositions was low.

In addition, though the liquid-crystalline blend composition in Comparative Example 3, which comprises LCP-II, LCP-IV and glass fiber as a filler exhibited good heat-resistance and impact strength, its dielectric constant was below 5 and its dielectric loss tangent was above 0.003 and, therefore, it exhibited poor dielectric properties.

What is claimed is:

1. A liquid-crystalline polyester blend composition comprising 100 parts by weight of a liquid-crystalline polyester blend and 0.1-300 parts by weight of calcium titanate and/or barium titanate:
    wherein said liquid-crystalline polyester blend is obtainable by combining liquid-crystalline polyester (A) (LCP A) and liquid-crystalline polyester (B) (LCP B) such that the ratio by weight of (LCP A)/(LCP B) is 99/1 to 80/20;
    wherein,
    LCP A consists of 100 molar parts of major repeating units and optionally 0.1-2 molar parts of one or two repeating units that come from corresponding minor copolymerizing components,
    wherein the major repeating units are selected from the group consisting of aromatic oxycarbonyl repeating unit, aromatic dioxy repeating unit and aromatic dicarbonyl repeating unit, wherein 40-80 mol % of the major repeating units are the unit represented by formula (I); and the amounts of the aromatic dioxy repeating unit and the aromatic dicarbonyl repeating unit in the major repeating units are equimolar; and
    LCP B is selected from the group consisting of liquid-crystalline polyester (b-1) (LCP b-1) and liquid-crystalline polyester (b-2) (LCP b-2), each consisting of 100 molar parts of major repeating units and optionally 0.1-2 molar parts of one or two repeating units that come from corresponding minor copolymerizing components;
    wherein the major repeating units of LCP b-1 are aromatic oxycarbonyl repeating units; and
    the major repeating units of LCP b-2 are selected from the group consisting of aromatic oxycarbonyl repeating unit, aromatic dioxy repeating unit and aromatic dicarbonyl repeating unit, wherein the amounts of aromatic dioxy repeating unit and aromatic dicarbonyl repeating unit in the major repeating units are equimolar,
    wherein greater than or equal to 90 mol % of the major repeating units of LCP b-1 and LCP b-2 each are repeating units represented by formulae (I) and (II), and the molar proportion of the repeating units represented by formulae (I) to (II) is from 10/90 to 50/50;
    provided that at least one of LCP A and LCP B comprises one or two repeating units that come from corresponding minor copolymerizing components selected from the group consisting of aromatic diol, aromatic dicarboxylic acid, aromatic monocarboxylic acid and aromatic monohydroxy compound

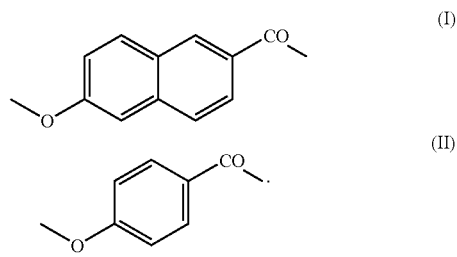

2. The liquid-crystalline polyester blend composition according to claim 1, wherein the aromatic oxycarbonyl repeating unit contained in LCP A as the major repeating unit is the repeating unit represented by formula (I).

3. The liquid-crystalline polyester blend composition according to claim 1, wherein the aromatic dioxy repeating unit in the major repeating units of LCP A and/or LCP b-2 is selected from the group consisting of the repeating units represented by formulae (1) to (3) and the aromatic dicarbonyl repeating unit in the major repeating units of LCP A and/or LCP b-2 is selected from the group consisting of the repeating units represented by formulae (4) to (6):

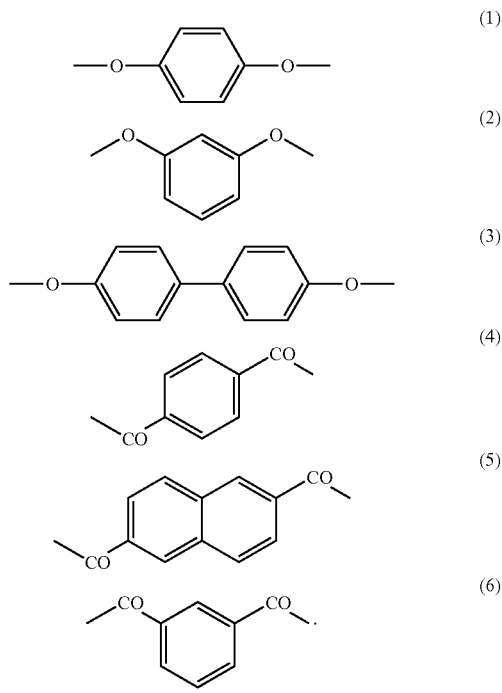

4. The liquid-crystalline polyester blend composition according to claim 1, wherein the mol % of the total amount of the repeating units represented by formulae (I) and (II) based on the total amount of the major repeating units of LCP B is greater than or equal to 95 mol %.

5. The liquid-crystalline polyester blend composition according to claim 1, which comprises at least one additional filler selected from the group consisting of glass fiber, silica-alumina fiber, alumina fiber, carbon fiber, potassium titanate fiber, aluminium borate fiber, aramid fiber, talc, mica, graphite, wollastonite, dolomite, clay, glass flake, glass beads, glass balloon, calcium carbonate, barium sulfate and titanium oxide, wherein the total amount of calcium titanate, barium titanate and at least one additional filler is 0.1-400 parts by weight per 100 parts by weight of the liquid-crystalline polyester blend.

6. The liquid-crystalline polyester blend composition according to claim 5, wherein said additional filler is glass fiber.

7. The liquid-crystalline polyester blend composition according to claim 1, wherein the dielectric constant measured at the frequency of 1 GHz using a stick-shaped test piece with length of 85 mm, width of 1.75 mm and thickness of 1.75 mm is greater than or equal to 5.

8. The liquid-crystalline polyester blend composition according to claim 1, wherein the dielectric loss tangent measured at the frequency of 1 GHz using a stick-shaped test piece with length of 85 mm, width of 1.75 mm and thickness of 1.75 mm is less than or equal to 0.003.

9. A molded article obtainable by molding the liquid-crystalline polyester blend composition according to claim 1.

10. The molded article according to claim 9, which is an antenna, connector or substrate.

* * * * *